May 12, 1970 R. SUTER 3,511,962
PROCESS FOR BOSS WELDING METAL SHEETS
Filed April 3, 1967

INVENTOR
Rolf Suter

BY Arthur Schwartz
ATTORNEY

United States Patent Office 3,511,962
Patented May 12, 1970

3,511,962
PROCESS FOR BOSS WELDING METAL SHEETS
Rolf Suter, Meilen, Zurich, Switzerland, assignor to H. A. Schlatter AG., Schlieren, Switzerland
Filed Apr. 3, 1967, Ser. No. 627,966
Claims priority, application Switzerland, Apr. 6, 1966, 5,192/66, Patent 442,561
Int. Cl. B23k 11/14
U.S. Cl. 219—93                                  1 Claim

ABSTRACT OF THE DISCLOSURE

A process for boss welding metal plates by pressing bosses outwardly from the plates on opposite sides in superimposed alignment. The plates are assembled into a stack contacted at opposite sides by an electrode having a recess for the projecting bosses to prevent a burn-up of the plates at the bosses. The plates are interconnected by passing an electric current therethrough.

The invention relates to a process for boss welding metal plates and more particularly to boss welding metal plates or sheets assembled in stacks or packets used for electrical application, such as stator plate packets for small motors, and to the plate packet produced by this process.

It is known that stator plate packets for small motors are provided on one side with projecting bosses and that the stacked plates are welded by press welding into a compact packet. This process has the disadvantage that the projecting bosses of the last plate in the stack causes substantial burn-up at the contact electrode due to the concentration of current at this spot so that a rapid deterioration occurs which requires a replacement of the electrode.

To overcome this disadvantage, a cover plate has been added which is thicker than the plates in the stack and is without bosses. In this arrangement the contact electrode is no longer destroyed. A disadvantage is the additional cover plate which has to be prepared and applied and the increased size of the stator packet as well as the increased electrical iron losses.

It is therefore an object of the invention to weld stator plate packets in a boss welding process without causing a destruction of the electrodes by local burn-up and without requiring the application of a cover plate on the projecting bosses of the top and bottom plates.

In the process for boss welding electric plates into a packet according to the invention especially statorplate packets for small motors, a portion of the bosses is produced on one side of each plate and a portion of the bosses is formed on the other side of each plate. The electrodes are provided on opposite sides of the stack above these bosses or projections with respective depressions extending at least over the periphery of the base line of the bosses and corresponding to their height.

Figure 1:
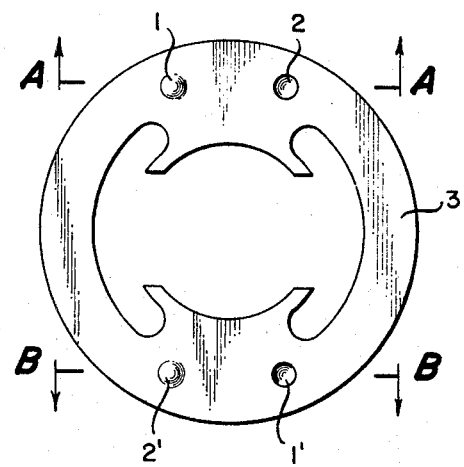
Figure 2:
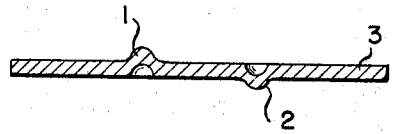
Figure 3:
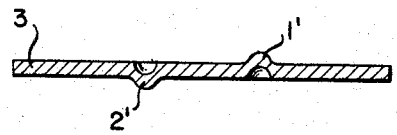
Figure 4:
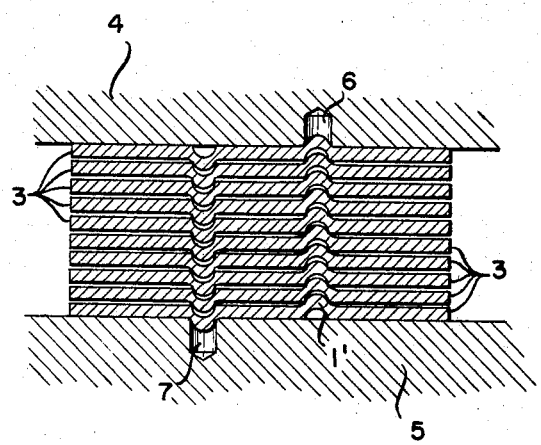

The various features and advantages will be described hereafter with reference to a specific embodiment of the invention illustrated in the accompanying drawing in which:

FIG. 1 shows a plan view of a single stator plate,
FIG. 2 shows a cross-section of a stator plate taken along line A—A of FIG. 1,
FIG. 3 shows a cross-section taken along line B—B of FIG. 1, and
FIG. 4 shows a cross-section through a stacked stator plate packet with applied electrodes.

In FIG. 1 the bosses 1 and 1' are pressed upwardly from the stator plate 3 with respect to the image plane as may be seen also from FIGS. 2 and 3, while the bosses 2 and 2' are pressed downwardly in FIG. 1 with reference to the image plane. FIG. 4 shows a plurality of stator plates 3 stacked on top of each other and before they are welded together. The electrode 4 bears on one side against the outermost plate or top plate and electrode 5 bears on the other side against the outermost plate or bottom plate of the stack. Above the bosses 1' a depression 6 is provided in the electrode 4 while a depression 7 is provided in the electrode 5.

The flux of the welding current and the pressure of the electrodes on the plate stack produces due to the increased current concentration across the bosses an increase of heat at these locations. The bosses become plastic so that they are interconnected and the stator plates which lie close together are combined into a compact packet.

The electrodes 4 and 5 cannot be burned up in this arrangement because the bosses of the outermost stator plates are received in the depressions 6 and 7, and no current concentrations can arise at these locations.

What is claimed is:
1. A process for boss welding electric plates into a packet, especially into a stator plate packet for small motors, wherein a portion of the bosses is pressed out on one side of each plate of the stack and a portion of the bosses is pressed out on the opposite side of each plate of the stack, and that the plates are interconnected by passing a current through electrodes bearing against the plate packet at opposite sides, said electrodes having depressions at the projecting bosses extending at least over the periphery of the base line of the bosses and corresponding to the height thereof.

References Cited

UNITED STATES PATENTS 3,200,489   8/1965   Keeleric _____ 219—93
3,354,290  11/1967   Monroe et al. _____ 219—120

JOSEPH V. TRUHE, Primary Examiner
H. BENDER, Assistant Examiner

U.S. Cl. X.R.
219—113